United States Patent
Lee et al.

(10) Patent No.: US 11,702,497 B2
(45) Date of Patent: Jul. 18, 2023

(54) MODIFIED CONJUGATED DIENE-BASED POLYMER AND METHOD FOR PREPARING SAME

(71) Applicant: LG Chem, Ltd., Seoul (KR)

(72) Inventors: Soo Yong Lee, Daejeon (KR); Dong Gil Lee, Daejeon (KR); Won Mun Choi, Daejeon (KR); Seung Ho Choi, Daejeon (KR)

(73) Assignee: LG Chem, Ltd.

( * ) Notice: Subject to any disclaimer, the term of this patent is extended or adjusted under 35 U.S.C. 154(b) by 411 days.

(21) Appl. No.: 17/251,578

(22) PCT Filed: Dec. 20, 2019

(86) PCT No.: PCT/KR2019/018255
§ 371 (c)(1),
(2) Date: Dec. 11, 2020

(87) PCT Pub. No.: WO2020/130738
PCT Pub. Date: Jun. 25, 2020

(65) Prior Publication Data
US 2021/0253767 A1    Aug. 19, 2021

(30) Foreign Application Priority Data

Dec. 21, 2018 (KR) .................. 10-2018-0167686

(51) Int. Cl.
*C08F 236/06* (2006.01)
*C08F 136/06* (2006.01)
*C08C 19/28* (2006.01)

(52) U.S. Cl.
CPC ................ *C08F 236/06* (2013.01)

(58) Field of Classification Search
USPC .............................. 525/331.9, 386
See application file for complete search history.

(56) References Cited

U.S. PATENT DOCUMENTS

| 5,064,910 A | 11/1991 | Hattori et al. |
| 5,567,784 A | 10/1996 | Wieder et al. |
| 9,845,366 B2 * | 12/2017 | Kloppenburg .......... C08L 15/00 |
| 2004/0102589 A1 | 5/2004 | Jang et al. |
| 2006/0089472 A1 * | 4/2006 | Viola ..................... C08C 19/44 |
| | | 526/335 |
| 2017/0015760 A1 | 1/2017 | Luo et al. |
| 2018/0022835 A1 | 1/2018 | Motoda et al. |
| 2021/0130578 A1 | 5/2021 | Gornard et al. |

FOREIGN PATENT DOCUMENTS

| EP | 0386808 A1 | 9/1990 |
| EP | 1400577 A1 | 3/2004 |
| EP | 3029074 A1 | 6/2016 |
| JP | H11209439 A | 8/1999 |
| JP | 4273887 B2 | 6/2009 |
| JP | 5217377 B2 | 6/2013 |
| KR | 100472649 B1 | 3/2005 |
| KR | 20150012063 A | 2/2015 |
| KR | 20160076248 A | 6/2016 |
| KR | 20170098236 A | 8/2017 |
| KR | 20180058133 A | 5/2018 |
| WO | 2018162855 A1 | 9/2018 |

OTHER PUBLICATIONS

Database WPI Week 201517 Thomson Scientific, London, GB; AN 2015-11341K & KR 2015 0012063 A (LG Chem Ltd); Feb. 3, 2015 (Feb. 3, 2015).
Extended European Search Report for Application No. EP 19899456, dated Jun. 29, 2021, 7 pages.
International Search Report for PCT/KR2019/018255 dated Apr. 7, 2020; 2 pages.

* cited by examiner

*Primary Examiner* — Fred M Teskin
(74) *Attorney, Agent, or Firm* — Lerner David LLP

(57) ABSTRACT

A modified conjugated diene-based polymer represented by Formula 1, wherein a terminal of a polymer chain is modified, and a method for preparing same are provided. By including a modifier derived unit having a specific structure, a beta value affecting cold flow may be reduced through controlling the degree of branch, and accordingly, the cold flow of a polymer may be efficiently controlled and a mooney viscosity increasing ratio may be improved.

17 Claims, No Drawings

MODIFIED CONJUGATED DIENE-BASED POLYMER AND METHOD FOR PREPARING SAME

CROSS-REFERENCE TO RELATED APPLICATIONS

The present application is a national stage entry under 35 USC § 371 of International Application No. PCT/KR2019/018255 filed on Dec. 20, 2019, which claims priority to Korean Patent Application No. 10-2018-0167686, filed on Dec. 21, 2018, the entire contents of which are incorporated herein by reference.

TECHNICAL FIELD

The present invention relates to a modified conjugated diene-based polymer in which at least one terminal is modified with a multifunctional acrylate-based modifier and which has high processability and compounding properties and low cold flow, and a method for preparing same.

BACKGROUND ART

Recently, according to the growing attention on saving energy and environmental issues, the decrease of the fuel consumption ratio of cars is required. As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition including abrasion resistance, crack resistance or processability arise.

In order to solve such problems, a method of modifying the polymerization active moiety of a conjugated diene-based polymer which is obtained by anionic polymerization using an organolithium with a functional group which is capable of interacting with an inorganic filler, has been developed as a method for increasing the dispersibility of an inorganic filler such as silica and carbon black in a rubber composition. Particularly, a method of modifying the polymerization active terminal of a conjugated diene-based polymer with a tin-based compound, a method of introducing an amino group, or a method of modifying with an alkoxysilane derivative has been suggested.

However, if a rubber composition is prepared using the modified conjugated diene-based polymer which has been modified by the above-described methods, low heating properties may be secured, but the improving effects of the physical properties of a rubber composition such as abrasion resistance and processability were insufficient.

As another method, a method of modifying a living active terminal using a specific coupling agent or a modifier in a living polymer obtained by coordination polymerization using a catalyst including a rare earth metal compound has been developed. However, a modified conjugated diene-based polymer such as polybutadiene prepared using a catalyst including a rare earth metal compound has high 1,4-cis content, high molecular weight and narrow molecular weight distribution, and thus, has improved physical properties such as tire rolling properties, but may induce problems concerning low processability and storage due to high cold flow.

Cold flow is a kind of physical properties, which affects the storage, workability and processability of a polymer, and means transforming properties of the shape of an initial polymer by the pressure of the weight of a polymer. If cold flow is high, the maintenance of product standard is difficult, and the decrease of storage and workability may be induced due to the reorganization of standard, and in severe cases, products may be contaminated and discarded. Cold flow is shown high in a polymer composition compounded by adding oil to a polymer to improve processability, and the up-regulation of Mooney viscosity and the degree of polymerization is very important for such products.

U.S. Pat. No. 5,567,784A discloses a method of preparing 1,4-cis polybutadiene and adding sulfur chloride and discloses a method of removing unreacted butadiene and low boiling materials to solve bad smell problems. However, since sulfur chloride is added later in the process, the complete removal of bad smell by sulfur is difficult. KR10-0472649B1 discloses a method of adding an organoborane compound such as triethylborane after a certain time from polymerization to a reaction system to improve cold flow, but the organoborane compound is in danger of self-ignition (boiling point: about −20° C.), and is required to be dealt with attention in conditions free from oxygen and moisture, and the control of Mooney viscosity is limited. EP0386808A1 makes an attempt for improving cold flow by injecting $PCl_3$ before finishing polymerization, but the control of cold flow was difficult, because Mooney viscosity was significantly changed with a small amount of $PCl_3$. U.S. Pat. No. 5,064,910A makes an attempt for increasing the molecular weight distribution of a polymer and improving cold flow and physical properties by injecting tin halide to a polymer, but by the modification with tin, there are problems of weakening a carbon-tin chemical bond in processing of time due to processing additives and environmental factors and of intrinsic heavy metal contamination.

The conventional techniques above-described have weak bonding force between a modifier derived unit and an active polymer, the decrease of 1,4-cis content, limitations on improving cold flow and limitations on controlling Mooney viscosity in addition to problems of bad smell due to additives.

PRIOR ART DOCUMENTS

Patent Documents (Patent Document 1) U.S. Pat. No. 5,567,784A (Oct. 22, 1996)
(Patent Document 2) KR10-0472649B1 (Feb. 11, 2005)
(Patent Document 3) EP0386808A1 (Sep. 12, 1990)
(Patent Document 4) U.S. Pat. No. 5,064,910A (Nov. 12, 1991)

DISCLOSURE OF THE INVENTION

Technical Problem

The present invention has been devised to solve the above-mentioned problems of the conventional technique, and an object of the present invention is to provide a modified conjugated diene-based polymer of which cold flow is efficiently controlled, processability may be improved and polymerization degree and Mooney viscosity increase may be controlled by decreasing a beta value which influences cold flow through controlling the degree of branch.

In addition, another object of the present invention is to provide a method for preparing the modified conjugated diene-based polymer.

Also, another object of the present invention is to provide a rubber composition including the modified conjugated diene-based polymer.

Technical Solution

To solve the above-described tasks, there is provided in the present invention a modified conjugated diene-based polymer which is represented by the following Formula 1, wherein a terminal of a polymer chain is modified:

[Formula 1]

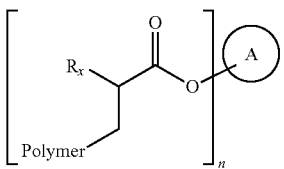

in Formula 1,
A may be a hydrocarbon unit of 2 to 12 carbon atoms or a hydrocarbon unit of 2 to 12 carbon atoms including one or more heteroatoms among N and O,
$R_x$ may be hydrogen or a methyl group, and
n may be an integer of 2 to 6.

In addition, the present invention provides a modified conjugated diene-based polymer having a beta value of 0.21 or less.

Also, the present invention provides a method for preparing a modified conjugated diene-based polymer, including 1) polymerizing a conjugated diene-based monomer in the presence of a catalyst composition including a rare earth metal compound to prepare an active polymer combined with an organometal; and 2) reacting the active polymer with a modifier represented by the following Formula 2:

[Formula 2]

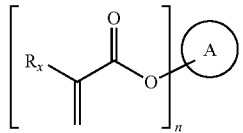

in Formula 2,
A may be a hydrocarbon unit of 2 to 12 carbon atoms or a hydrocarbon unit of 2 to 12 carbon atoms including one or more heteroatoms among N and O,
$R_x$ may be hydrogen or a methyl group, and
n may be an integer of 2 to 6.

In addition, the present invention provides a rubber composition including the modified conjugated diene-based polymer.

Advantageous Effects

The modified conjugated diene-based polymer according to an embodiment of the present invention has a structure represented by Formula 1, wherein the terminal of a polymer chain is modified, and accordingly, terminal crosslinking bonds connecting polymer chains via strong carbon-carbon bonds may be achieved, cold flow may be efficiently controlled by decreasing a beta value through controlling the degree of branching, processability may be markedly improved, and crosslinking bonds may be formed via strong carbon-carbon bonds, thereby restraining the change of a polymer with the passage of time due to various additives which may be added during compounding a rubber composition.

In addition, since the modified conjugated diene-based polymer according to an embodiment of the present invention includes a modifier derived unit at a terminal, the linearity in a polymer chain may be maintained and excellent physical properties may be secured. In addition, since a modifier derived unit with a specific structure in included at the terminal, the degree of branching may be controlled through crosslinking between polymer chains, and a polymerization degree and the Mooney viscosity increasing ratio before and after modification may be controlled, and accordingly, compounding properties such as tensile properties and viscoelasticity properties during compounding into a rubber composition may be improved.

BEST MODE FOR CARRYING OUT THE INVENTION

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

[Terms]

The term "preforming" used in the present disclosure means pre-polymerization in a catalyst composition for polymerizing a conjugated diene. Particularly, if a catalyst composition for polymerizing a conjugated diene, including a rare earth metal compound, an alkylating agent including an aluminum compound, and a halogen compound includes an aluminum hydride-based compound such as diisobutyl aluminum hydride (hereinafter, DIBAH) as the aluminum compound, a small amount of a monomer such as butadiene is included together to decrease the production possibility of diverse catalyst active species. Accordingly, the pre-polymerization of butadiene is performed in the catalyst composition for preparing a conjugated diene-based polymer prior to the polymerization reaction for preparing a conjugated diene-based polymer, and this process is referred to as preforming.

In addition, the term "premixing" used in the present disclosure means a homogenously mixed state of each of constituent components without being polymerized in a catalyst composition.

In addition, the term "catalyst composition" used in the present disclosure means a simple mixture of constituent components, diverse composites caused by physical or chemical attraction, or a chemical reaction product of constituent components.

The term "alkyl group" used in the present invention may mean a monovalent aliphatic saturated hydrocarbon and may include a linear alkyl group such as methyl, ethyl, propyl and butyl and a branched alkyl group such as isopropyl, sec-butyl, tert-butyl and neo-pentyl.

[Measurement Methods]

In the present invention, "Mooney viscosity (MV)" is a measure judging the processability of a polymer, and if the Mooney viscosity is low to an appropriate level, it could be judged that flowability is good and processability is excellent. The unit is represented by Mooney Unit (MU), a ML (1+4) value is obtained at 100° C., where M represents Mooney, L represents a plate size, 1 represents 1 minute which is preheating time, and 4 represents reading a value after 4 minutes from rotor operation.

Particularly, the Mooney viscosity was measured while applying torque after standing a polymer at room temperature (23±3° C.) for 30 minutes or more, collecting 27±3 g of the polymer and putting in a die cavity, and then, operating platen by using MV2000E (Monsanto Co.) and using Large Rotor at 100° C. at a rotor speed of 2±0.02 rpm.

In the present invention, "molecular weight distribution (PDI; MWD, Mw/Mn)" represents the degree of the molecular weight distribution of a polymer and is calculated from a ratio (Mw/Mn) of a weight average molecular weight (Mw) to a number average molecular weight (Mn) of a polymer. The weight average molecular weight and the number average molecular weight were measured after dissolving a polymer in tetrahydrofuran (THF) for 30 minutes under 40° C. conditions and using gel permeation chromatography (GPC). In this case, two columns of PLgel Olexis and one column of PLgel mixed-C (trade names of Polymer Laboratories Co.) were used in combination, and newly replaced columns were all mixed bed type columns, and polystyrene was used as a GPC standard material.

In the present invention, "beta value (β-value)" is the function of frequency and represents the degree of branching of a polymer. If the value decreases, the degree of branching increases, and if the value increases, the degree of branching decreases. Particularly, the beta value was obtained using D-RPA 3000 (rubber process analyzer) of Montech Co. and was represented by a beta value (β-value) by measuring tan δ in a frequency sweep range of 0-100 Hz, at static strain of 3%, at dynamic strain of 0.25% and at measurement temperature of 100° C. and representing as the slope of d(log(tan δ))/d(log(freq))). Here, tan δ is an index representing common viscoelasticity properties and is a value represented by the ratio of viscosus modulus (G") with respect to elastic modulus (G').

According to an embodiment of the present invention, there is provided a modified conjugated diene-based polymer represented by the following Formula 1, wherein a terminal of a polymer chain is modified:

[Formula 1]

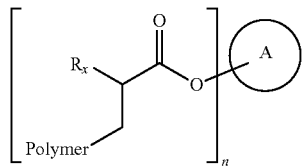

in Formula 1,

A may be a hydrocarbon unit of 2 to 12 carbon atoms or a hydrocarbon unit of 2 to 12 carbon atoms including one or more heteroatoms among N and O, $R_x$ may be hydrogen or a methyl group, and n may be an integer of 2 to 6.

Particularly, in Formula 1, the hydrocarbon unit of 2 to 12 carbon atoms may be a unit represented by the following Formula 3:

$$*-R_{a1}-*$$ [Formula 3]

in Formula 3, $R_{a1}$ may be a linear or branched alkylene group of 2 to 12 carbon atoms, or an arylene group of 6 to 12 carbon atoms, and

* is a position where a derived unit of (meth)acrylate of Formula 1 is combined.

In addition, in Formula 1, the hydrocarbon unit of 2 to 12 carbon atoms including one or more heteroatoms among N and O may be any one among the units represented by the following formulae 4-1 to 4-4:

$$(R_{b1})_3C-R_{b2}-O-R_{b3}-C(R_{b4})_{m1}(R_{b5})_{3-m1}$$ [Formula 4-1]

in Formula 4-1, $R_{b1}$ and $R_{b4}$ may be each independently an alkyl group of 1 to 5 carbon atoms, wherein a derived unit of (meth)acrylate of Formula 1 may be combined at a terminal, $R_{b2}$ and $R_{b3}$ may be each independently an alkylene group of 1 to 5 carbon atoms, $R_{b5}$ may be a hydroxyl group, and $m1$ may be an integer of 1 to 3;

$$C(R_{c1}-O-R_{c2})_{m2}(R_{c3})_{4-m2}$$ [Formula 4-2]

in Formula 4-2, $R_{c1}$ may be an alkylene group of 1 to 6 carbon atoms, $R_{c2}$ may be an alkyl group of 1 to 6 carbon atoms, wherein a derived unit of (meth)acrylate of Formula 1 may be combined at a terminal, $R_{c3}$ may be hydrogen or an alkyl group of 1 to 6 carbon atoms, and $m2$ may be an integer of 1 to 4;

$$C(R_{d1})_{m3}(R_{d2})_{4-m3}$$ [Formula 4-3]

in Formula 4-3, $R_{d1}$ may be an alkyl group of 1 to 6 carbon atoms, wherein a derived unit of (meth)acrylate of Formula 1 may be combined at a terminal, $R_{d2}$ may be a hydroxyl group or an alkyl group of 1 to 6 carbon atoms, and $m3$ may be an integer of 1 to 4;

[Formula 4-4]

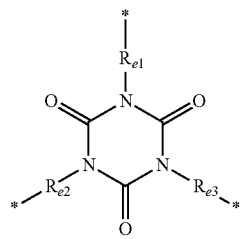

in Formula 4-4, $R_{e1}$ to $R_{e3}$ may be each independently an alkylene group of 1 to 5 carbon atoms, and

* is a position where a derived unit of (meth)acrylate of Formula 1 is combined.

Here, the derived unit of (meth)acrylate of Formula 1 represents a (meth)acrylate group combined with a polymer chain, and particularly, in Formulae 3 to 4-3, the combination of the derived unit of the (meth)acrylate of Formula 1 at the terminal represents the combination of the terminal of the hydrocarbon unit with polymer-$CH_2CHR_xCOO$— of Formula 1. In addition, in Formula 4-4, represents the combining position of polymer-$CH_2CHR_xCOO$— of Formula 1.

More particularly, the modified conjugated diene-based polymer may include a modifier derived functional group which is derived from one or more modifiers selected from the group consisting of dipentaerythritol hexaacrylate, dipentaerythritol hydroxy pentaacrylate, pentaerythritol tetraacrylate, pentaerythritol triacrylate, trimethylolpropane triacrylate, propoxylated glycerol triacrylate, trimethylolpropane ethoxylated triacrylate, 1,6-hexanediol diacrylate, 1,4-butanediol diacrylate, 1,2-ethanediol diacrylate, neopentyl glycol diacrylate, 1,3-butanediol diacrylate, 1,4-phenylene diacrylate, tris(2-hydroxyethyl)isocyanurate triacrylate, tripropylene glycol diacrylate, polyethylene glycol diacrylate, dipentaerythritol hexamethacrylate, dipentaerythritol hydroxy pentamethacrylate, pentaerythritol tetramethacrylate, pentaerythritol trimethacrylate, trimethylolpropane trimethacrylate, propoxylated glycerol trimethacrylate, trimethylolpropane ethoxylated trimethacrylate, trimethylolpropane ethoxy trimethacrylate, 1,6-hexanediol metacrylate, 1,4-butanediol dimethacrylate, 1,2-ethanediol dimethacrylate, neopentyl glycol dimethacrylate, 1,3-butanediol dimethacrylate, 1,4-phenylene dimethacrylate, isocyanurate trimethacrylate, tripropylene glycol dimethacrylate, ethylene glycol dimethacrylate, and polyethylene glycol dimethacrylate.

In addition, according to an embodiment of the present invention, the modified conjugated diene-based polymer represented by Formula 1 may not include a metal and a metalloid. Particular examples of the metal and metalloid may be silicon, germanium, tin, etc., and particularly, the modified conjugated diene-based polymer of the present invention may not include silicon, germanium or tin. Since the metal and metalloid are not included in the modified conjugated diene-based polymer, gel formation may be restrained, a homogeneous polymer having high purity may be obtained, and the contamination of a polymerization reactor due to gel formation may be prevented. In addition, since the bonding force between carbon-carbon formed in the present invention is stronger than the bonding force between the metal or metalloid with carbon, decreasing phenomenon of the degree of branching after mixing with various additives and then heating at a high temperature may be suppressed. In addition, since there are no heavy metal problems and no influence by the poison of an organometallic material, the safety of working environment may be improved advantageously.

The modified conjugated diene-based polymer according to an embodiment of the present invention has a structure represented by Formula 1, wherein the terminal of a polymer chain is modified, and accordingly, a low beta value (β-value) may be obtained through the crosslinking bond between chains and characteristics of efficiently controlling cold flow may be achieved. In addition, since the modified conjugated diene-based polymer according to an embodiment of the present invention introduces a branch structure through undergoing a modification step, the increasing ratio of the Mooney viscosity of a polymer after modification with respect to the Mooney viscosity of a polymer before modification may be markedly increased, processability during compounding into a rubber composition may be improved, and compounding properties such as tensile properties and viscoelasticity properties may be improved.

In addition, the modified conjugated diene-based polymer according to an embodiment of the present invention has wide molecular weight distribution (PDI; polydispersity) of 1.05 to 5.0, particularly, 2.0 to 3.5, more particularly, 2.5 to 3.5, which is the ratio (Mw/Mn) of a weight average molecular weight (Mw) and a number average molecular weight (Mn). If the molecular weight distribution is wide, processability properties and viscoelasticity properties are excellent in case where applying to a rubber composition.

Here, the molecular weight distribution may be calculated from the ratio (Mw/Mn) of the weight average molecular weight (Mw) to the number average molecular weight (Mn), and in this case, the number average molecular weight (Mn) is a common average of the molecular weights of individual polymers, which is obtained by measuring the molecular weights of n polymer molecules, obtaining the total of the molecular weights, and dividing the total by n, and the weight average molecular weight (Mw) represents molecular weight distribution of a polymer composition.

In addition, the conjugated diene-based polymer according to an embodiment of the present invention may satisfy the above-mentioned molecular weight distribution conditions and at the same time, may have a weight average molecular weight (Mw) of 300,000 g/mol to 1,500,000 g/mol, particularly 700,000 g/mol to 1,100,000 g/mol. In addition, the conjugated diene-based polymer according to an embodiment of the present invention may have a number average molecular weight (Mn) of 100,000 g/mol to 700,000 g/mol, particularly 150,000 g/mol to 500,000 g/mol. If applied to a rubber composition within the ranges, tensile properties may be excellent, processability may be good, and the workability of the rubber composition may be improved. Accordingly, mixing and kneading may become easy, and the balance between the mechanical properties and physical properties of a rubber composition may become excellent.

More particularly, if the conjugated diene-based polymer according to an embodiment of the present invention satisfies the conditions of the molecular weight distribution together with the weight average molecular weight (Mw) and the number average molecular weight (Mn) and is applied to a rubber composition, tensile properties, viscoelasticity and processability on the rubber composition may be excellent, and balance among physical properties may be excellent.

In addition, the modified conjugated diene-based polymer may have a Mooney viscosity (MV) at 100° C. of a polymer before modification of 10 to 90, particularly, 30 to 80, more particularly, 30 to 60. In addition, the Mooney viscosity (MV) at 100° C. of a polymer after modification may be 50 to 130, particularly, 60 to 120, more particularly, 65 to 120, or 70 to 110.

In the present invention, the Mooney viscosity may be measured by means of a Mooney viscometer, for example, MV2000E of Monsanto Co., using a large rotor at 100° C. at a rotor speed of 2±0.02 rpm. In this case, a specimen used is stood at room temperature (23±3° C.) for 30 minutes or more, and 27±3 g of the specimen is collected and put in a die cavity, and then, the Mooney viscosity may be measured by operating a platen.

In addition, the modified conjugated diene-based polymer according to an embodiment of the present invention may have a Mooney viscosity increasing ratio of a conjugated diene-based polymer after modification based on the Mooney viscosity of a conjugated diene-based polymer before modification (hereinafter, will be described as Mooney viscosity increasing ratio) of 20% or more, preferably, 35% or more, more preferably, 50% to 150% in view of efficient controlling cold flow and the significant improvement of processability. Here, the Mooney viscosity increasing ratio is a value represented by percent for a value obtained by dividing a difference of the Mooney viscosity of a conjugated diene-based polymer after modification and the Mooney viscosity of a conjugated diene-based polymer before modification by the money viscosity of the conjugated diene-based polymer before modification, and may be computed from the following Mathematical Formula 1:

[Mathematical Formula 1]

Mooney viscosity increasing ratio (%) =

$$\frac{(\text{mooney viscosity at } 100°\text{C. of polymer after modification-mooney viscosity at } 100°\text{C. of polymer before modification})}{(\text{mooney viscosity at } 100°\text{C. of polymer before modification})} \times 100.$$

The large Mooney viscosity increasing ratio means the large increase of the Mooney viscosity after modification, and within the above-described range of the increasing ratio, cold flow may decrease through the control of the degree of branching, and processability and compounding properties may be improved to an excellent degree.

In addition, the modified conjugated diene-based polymer according to an embodiment of the present invention may have a beta value (β-value) of 0.21 or less, preferably, 0.10 to 0.21, or 0.10 to 0.20 in view of attaining further decreased cold flow. If the above-described range is satisfied, the control of the cold flow of the polymer may be significantly improved. Here, the beta value is the function of frequency and represents the degree of branching of a polymer. If the value decreases, the degree of branching increases, and if the value increases, the degree of branching decreases. Particularly, the beta value was obtained by measuring using D-RPA 3000 (rubber process analyzer) of Montech Co., measuring tan δ in a frequency sweep range of 0-100 Hz, at a static strain of 3%, at dynamic strain of 0.25% and at a measurement temperature of 100° C., and representing a slope of d(log(tan δ)/d(log(freq)) as a beta value (β-value). Here, tan δ is an index representing viscoelasticity properties and is a value represented by the ratio of viscosus modulus (G") to elastic modulus (G').

If the modified conjugated diene-based polymer according to an embodiment of the present invention satisfies the molecular weight distribution, the weight average molecular weight and the number average molecular weight, and at the same time, the beta value and the Mooney viscosity range before and after modification, and is applied to a rubber composition, the improving effects of physical properties may be achieved in balance without leaning to any one among compounding properties such as tensile properties and viscoelasticity properties, processability and cold flow.

In addition, in the modified conjugated diene-based polymer according to an embodiment of the present invention, the conjugated diene-based polymer may be a butadiene homopolymer such as polybutadiene, or a butadiene copolymer such as a butadiene-isoprene copolymer.

As particular examples, the conjugated diene-based polymer may include 80 to 100 wt % of a repeating unit derived from 1,3-butadiene monomer, and selectively, 20 wt % or less of a repeating unit derived from other conjugated diene-based monomers which are copolymerizable with 1,3-butadiene, and within the range, effects of not reducing the 1,4-cis bond content in a polymer may be obtained. In this case, as the 1,3-butadiene monomer, 1,3-butadiene or the derivatives thereof including 1,3-butadiene, 2,3-dimethyl-1,3-butadiene, and 2-ethyl-1,3-butadiene may be used, and as the other conjugated diene-based monomers which are copolymerizable with 1,3-butadiene, 2-methyl-1,3-pentadiene, 1,3-pentadiene, 3-methyl-1,3-pentadiene, 4-methyl-1,3-pentadiene, 1,3-hexadiene or 2,4-hexadiene may be used, and any one or a compound of two or more thereof may be used.

The modified conjugated diene-based polymer according to an embodiment of the present invention may be a rare earth metal catalyzed modified conjugated diene-based polymer, more particularly, a neodymium catalyzed modified conjugated diene-based polymer. The neodymium catalyzed modified conjugated diene-based polymer may represent a modified conjugated diene-based polymer prepared using a catalyst composition including a neodymium compound. More particularly, the modified conjugated diene-based polymer may be a neodymium catalyzed modified conjugated diene-based polymer including a repeating unit derived from a 1,3-butadiene monomer.

According to an embodiment, there is provided a method for preparing a modified conjugated diene-based polymer including: 1) polymerizing a conjugated diene-based monomer in the presence of a catalyst composition including a rare earth metal compound to prepare an active polymer combined with an organometal; and 2) reacting the active polymer with a modifier represented by the following Formula 2:

[Formula 2]

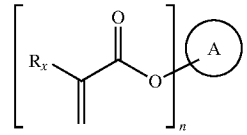

in Formula 2,

A may be a hydrocarbon unit of 2 to 12 carbon atoms or a hydrocarbon unit of 2 to 12 carbon atoms including one or more heteroatoms among N and O, $R_x$ may be hydrogen or a methyl group, and n may be an integer of 2 to 6.

Particularly, specific examples of the hydrocarbon unit and the hydrocarbon unit including a heteroatom of the modifier represented by Formula 2 of the present invention are the same as described in the modified conjugated diene-based polymer, and in this case, the "derived unit from (meth)acrylate of Formula 1" in Formula 3 to Formula 4-4 may be replaced with the "(meth)acrylate of Formula 2".

More particularly, the modifier represented by Formula 2 may include one or more selected from the group consisting of dipentaerythritol hexaacrylate, dipentaerythritol hydroxy pentaacrylate, pentaerythritol tetraacrylate, pentaerythritol triacrylate, trimethylolpropane triacrylate, propoxylated glycerol triacrylate, trimethylolpropane ethoxylated triacrylate, 1,6-hexanediol diacrylate, 1,4-butanediol diacrylate, 1,2-ethanediol diacrylate, neopentyl glycol diacrylate, 1,3-butanediol diacrylate, 1,4-phenylene diacrylate, tris(2-hydroxyethyl)isocyanurate triacrylate, tripropylene glycol diacrylate, polyethylene glycol diacrylate, dipentaerythritol hexamethacrylate, dipentaerythritol hydroxy pentamethacrylate, pentaerythritol tetramethacrylate, pentaerythritol trimethacrylate, trimethylolpropane trimethacrylate, propoxylated glycerol trimethacrylate, trimethylolpropane ethoxylated trimethacrylate, trimethylolpropane ethoxy trimethacrylate, 1,6-hexanediol metacrylate, 1,4-butanediol dimethacrylate, 1,2-ethanediol dimethacrylate, neopentyl glycol dimethacrylate, 1,3-butanediol dimethacrylate, 1,4-phenylene dimethacrylate, isocyanurate trimethacrylate, tripropylene glycol dimethacrylate, ethylene glycol dimethacrylate, and polyethylene glycol dimethacrylate.

In addition, according to an embodiment of the present invention, the modifier represented by Formula 2 may not include a metal and a metalloid. Particular examples of the metal and metalloid may be silicon, germanium, tin, etc., and particularly, the modifier of the present invention may not include silicon, germanium or tin. Since the metal and metalloid are not included in the modified conjugated diene-based polymer, gel formation may be restrained, a homogeneous polymer having high purity may be obtained, and the contamination of a polymerization reactor due to gel formation may be prevented. In addition, since the bonding force between carbon-carbon formed in the present invention is stronger than the bonding force between the metal or metalloid with carbon, decreasing phenomenon of the degree of branching after mixing with various additives and then heating at a high temperature may be suppressed. In addition, there are no heavy metal problems and no influence by the poison of an organometallic material, and the safety of working environment may be improved advantageously. Also, if the modifier includes a metal and metalloid, the introduction of a branch structure is insufficient, and the physical properties required in the present invention, particularly a low beta value and a high Mooney viscosity increasing ratio may not be accomplished, and accordingly, the cold flow of a polymer may not be efficiently controlled, and compounding properties may also be degraded.

The step 1) according to an embodiment of the present invention is a step of polymerizing a conjugated diene-based monomer in the presence of a catalyst composition including a rare earth metal compound to prepare an active polymer, wherein the active polymer may represent an active polymer combined with an organometal.

The polymerization according to an embodiment of the present invention may be performed by coordination polymerization, may be performed by, for example, solution polymerization, and may be performed by a batch method, a continuous method and a semi-continuous method. In a particular embodiment, the polymerization for preparing the conjugated diene-based polymer may be performed by injecting a conjugated diene-based monomer to a catalyst composition and reacting in an organic solvent.

Particularly, if the preparation is performed by the solution polymerization, the conjugated diene polymer according to an embodiment of the present invention may be performed by injecting a conjugated diene-based monomer to the catalyst composition and reacting in a polymerization solvent.

As the conjugated diene-based monomer, any one used for preparing a common conjugated diene-based polymer may be used, without specific limitation. The conjugated diene-based monomer may particularly be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, etc., and any one or a mixture of two or more thereof may be used. More particularly, the conjugated diene-based monomer may be 1,3-butadiene.

In addition, other monomers which are capable of copolymerizing with the conjugated diene monomer may be further used in consideration of the physical properties of the conjugated diene polymer finally prepared. The other monomers may particularly include an aromatic vinyl monomer such as styrene, p-methylstyrene, α-methylstyrene, 1-vinylnaphthalene, 3-vinyltoluene, ethylvinylbenzene, divinylbenzene, 4-cyclohexylstyrene, and 2,4,6-trimethylstyrene, and any one or a mixture of two or more thereof may be used. The other monomers may be used in an amount of 20 wt % or less based on the total weight of the monomers used in the polymerization reaction.

In this case, the conjugated diene-based monomer is used not such that the total amount used for the preparation of a diene-based polymer is dissolved in a non-polar solvent, but such that a portion of the total amount is dissolved in a polymerization solvent and polymerized, and then injected in installments according to the polymerization conversion ratio in once or more times, particularly, in twice or more times, and more particularly, in twice to four times.

In addition, the solvent included during polymerization may be a hydrocarbon-based solvent, and the hydrocarbon-based solvent may be a non-polar solvent. Particularly, the hydrocarbon-based solvent may use one or more selected from the group consisting of aliphatic hydrocarbon-based solvents such as pentane, hexane, isopentane, heptane, octane and isooctane; cycloaliphatic hydrocarbon-based solvents such as cyclopentane, methylcyclopentane, cyclohexane, methylcyclohexane, and ethylcyclohexane; and aromatic hydrocarbon-based solvents such as benzene, toluene, ethylbenzene and xylene. As the particular examples of the hydrocarbon-based solvent, aliphatic hydrocarbon-based solvents such as hexane may be used. The concentration of the monomer used in the polymerization solvent is not specifically limited, but may be 3 wt % to 80 wt %, more particularly, 10 wt % to 30 wt %.

In addition, during the polymerization, additives may be further used, including a molecular weight controlling agent such as trimethylaluminum, diisobutylaluminum hydride, and trimethylsilane; a reaction quenching agent for finishing polymerization reaction such as polyoxyethylene glycol phosphate; and an antioxidant such as 2,6-di-t-butylparacresol. In addition, additives generally serving easy solution polymerization, particularly, additives such as a chelating agent, a dispersant, a pH controlling agent, a deoxidizer, and an oxygen scavenger may be selectively used.

The polymerization reaction may be performed at a temperature of 20° C. to 200° C., more particularly, 20° C. to 100° C.

In addition, the polymerization reaction may be performed in the above-mentioned temperature range for 5 minutes to 3 hours, particularly, 15 minutes to 2 hours, more particularly, 30 minutes to 2 hours until the conversion ratio of the conjugated diene-based polymer reaches 100%.

The rare earth metal catalyst composition according to an embodiment of the present invention may include (a) a rare earth metal compound, (b) an alkylating agent and (c) a halogen compound and may further include a conjugated diene-based monomer.

Particularly, the catalyst composition may be prepared by injecting a rare earth metal compound, an alkylating agent, a halogen compound, and selectively conjugated diene-based monomer to a hydrocarbon-based solvent in order and then, mixing.

In this case, in order to promote the production of a catalyst active species, the mixing process may be performed in a temperature range of −10° C. to 30° C., and in this case, heat treatment may be performed at the same time to fulfill the above-mentioned temperature conditions.

More particularly, the catalyst composition may be prepared by mixing a rare earth metal compound, an alkylating agent and a solvent, firstly heat treating at a temperature of −10° C. to 30° C., adding a halogen compound to the resultant mixture thus obtained and secondly heat treating in a temperature range of −10° C. to 30° C.

In the catalyst composition prepared by the above-mentioned preparation method, a catalyst active species may be produced due to the interaction of constituent components. The catalyst composition thus prepared may further undergo an aging process in low temperature conditions.

In addition, the hydrocarbon-based solvent in the catalyst composition may use one or more among the above-described hydrocarbon-based solvents included during polymerization.

In addition, catalyst activity may be improved and further, the stabilizing effects of the conjugated diene-based polymer thus prepared may be attained by premixing a portion of the conjugated diene-based monomer used in the polymerization reaction with the catalyst composition and then using as a preforming catalyst composition type.

Hereinafter, each component will be explained in detail.

(a) Rare Earth Metal Compound

In the catalyst composition according to an embodiment of the present invention, the rare earth metal compound is activated by an alkylating agent to produce a catalyst active species for polymerizing a conjugated diene.

As the rare earth metal compound, any one commonly used for the preparation of a conjugated diene-based polymer may be used, without specific limitation. Particularly, the rare earth metal compound may be a compound including one or two or more rare earth metals having atomic numbers of 57 to such as lanthanum, neodymium, cerium, gadolinium and praseodymium, and more particularly, a compound including one or two or more selected from the group consisting of neodymium, lanthanum and gadolinium, may be used.

In addition, the rare earth metal compound may be rare earth metal-containing carboxylates (for example, neodymium acetate, neodymium acrylate, neodymium methacrylate, neodymium acetate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyldithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium iodide, neodymium cyanide, neodymium cyanate, neodymium thiocyanate, neodymium azide, etc.), oxyhalides (for example, neodymium oxyfluoride, neodymium oxychloride, neodymium oxybromide, etc.), or organic lanthanide rare earth metal compounds including one or more rare earth metal-carbon bonds (for example, $Cp_3Ln$, $Cp_2LnR'$, $Cp_2LnCl$, $CpLnCl_2$, $CpLn$ (cyclooctatetraene), $(C_5Me_5)_2LnR'$, $Ln(R')_3$, $Ln(allyl)_3$, $Ln(allyl)_2C_1$, etc., where Ln is a rare earth metal element, and R' is a monovalent organic group combined with a metal element through a carbon atom and may be a hydrocarbyl group), etc. and may include any one or a mixture of two or more thereof.

More particularly, the rare earth metal compound may be a neodymium compound represented by the following Formula 5:

[Formula 5]

$$Nd\left(-O-\underset{R_2}{\overset{O}{\underset{|}{C}}}-\underset{R_3}{\overset{R_1}{\underset{|}{C}}}\right)_3$$

in Formula 5, $R_1$ to $R_3$ are each independently a hydrogen atom, or a linear or branched alkyl group of 1 to 12 carbon atoms.

More particularly, the rare earth metal compound may be a neodymium compound of Formula 5, where $R_1$ is a linear or branched alkyl group of 6 to 12 carbon atoms, $R_2$ and $R_3$ are each independently a hydrogen atom, or a linear or branched alkyl group of 2 to 6 carbon atoms, but $R_2$ and $R_3$ are not hydrogen atoms at the same time, more particularly, a neodymium compound of Formula 5, where $R_1$ is a linear or branched alkyl group of 6 to 8 carbon atoms, and $R_2$ and $R_3$ are each independently a linear or branched alkyl group of 2 to 6 carbon atoms.

As described above, if the neodymium compound of Formula 5 includes a carboxylate ligand including an alkyl group with various lengths of 2 or more carbon atoms at an a position as a substituent, steric change may be induced around a neodymium central metal to block tangling between compounds. As a result, oligomerization is suppressed and a conversion ratio into an active species is high. Such a neodymium compound has high solubility in a polymerization solvent, and the ratio of neodymium positioned in the central part, which has difficulty in conversion into a catalyst active species, is decreased to increase the conversion ratio into the catalyst active species.

More particularly, the rare earth metal compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of two or more thereof. In addition, in consideration of excellent solubility in a polymerization solvent without fear of oligomerization, excellent conversion ratio into a catalyst active species and consequent improving effect of catalyst activity, the neodymium compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$, or a mixture of two or more thereof.

In addition, the rare earth metal compound may have a solubility of about 4 g or more per 6 g of a non-polar solvent at room temperature (23±5° C.). In the present invention, the solubility of the neodymium compound means the degree of clear dissolution without generating turbid phenomenon. Through showing such high solubility, excellent catalyst activity may be shown.

The rare earth metal compound may be used, for example, in an amount of 0.1 to 0.5 mmol, more particularly, 0.1 to 0.2 mmol per 100 g of a conjugated diene-based monomer used for polymerization, and within this range, catalyst activity is high, appropriate catalyst concentration is attained, and a separate demineralization process is not required.

The rare earth metal compound may be used as a reaction product type with a Lewis base. Due to the Lewis base, the reaction product may attain improved solubility of the rare earth metal compound in a solvent and may attain the effect of stable storage for a long time. The Lewis base may be used in a ratio of 30 mol or less, or 1 to 10 mol per 1 mol of a rare earth element. The Lewis base may be, for example, acetyl acetone, tetrahydrofuran, pyridine, N,N-dimethylformamide, thiophene, diphenyl ether, triethylamine, organophosphorous compounds or monohydric or dihydric alcohols.

(b) Alkylating Agent

In the catalyst composition for polymerizing the conjugated diene according to an embodiment of the present invention, the alkylating agent is an organometallic compound which is capable of delivering a hydrocarbyl group to another metal and plays the role of a co-catalyst. Any alkylating agents commonly used for the preparation of a diene-based polymer may be used as the alkylating agent, without specific limitation.

Particularly, the alkylating agent is soluble in a non-polar solvent, particularly, a non-polar hydrocarbon-based solvent, and may be an organometallic compound including a bond between a cationic metal such as metals in group 1, 2, or 3 with carbon, or a boron-containing compound. More particularly, the alkylating agent may be one or two or more selected from the group consisting of an organoaluminum compound, an organomagnesium compound, and an organolithium compound, or a mixture of at least two thereof.

In the alkylating agent, the organoaluminum compound may be, particularly, a compound of the following Formula 6:

[Formula 6]

in Formula 6,

R is each independently a monovalent organic group which is combined with an aluminum atom via a carbon atom, and may be a hydrocarbyl group such as an alkyl group of 1 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group, and an alkynyl group of 2 to 32 carbon atoms; or a heterohydrocarbyl group containing at least one heteroatom selected from the group consisting of a nitrogen atom, an oxygen atom, a boron atom, a silicon atom, a sulfur atom, and a phosphor atom in place of carbon in a hydrocarbyl structure, X is each independently selected from the group consisting of a hydrogen atom, a halogen group, a carboxyl group, an alkoxy group and an aryloxy group, and z is an integer of 1 to 3.

More particularly, the organoaluminum compound may include dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride, or the like. Preferably, diisobutylaluminum hydride may be included.

In addition, the organoaluminum compound may be an aluminoxane.

The aluminoxane may be prepared by reacting trihydrocarbyl aluminum-based compounds with water, and may particularly be a linear aluminoxane represented by the following Formula 7a or a circular aluminoxane represented by the following Formula 7b:

[Formual 7a]

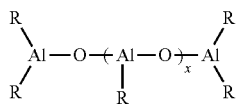

[Formula 7b]

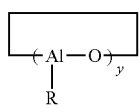

in Formulae 7a and 7b, R is a monovalent organic group which is combined with an aluminum atom via a carbon atom and is the same as the above-defined R, x and y may be each independently an integer of 1 or more, particularly, 1 to 100, and more particularly, an integer of 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of at least two thereof may be used.

In addition, in the aluminoxane compound, the modified methylaluminoxane may be obtained by substituting the methyl group of the methylaluminoxane with a modifier (R), particularly, a hydrocarbonyl group of 2 to 20 carbon atoms, particularly, a compound represented by the following Formula 8:

[Formula 8]

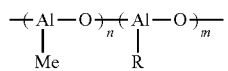

in Formula 8, R is the same as defined above, and m and n may be an integer of 2 or more. In addition, in Formula 8, Me means a methyl group.

More particularly, R in Formula 8 may be a linear or branched alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group or an alkynyl group of 2 to 20 carbon atoms, more particularly, a linear or branched alkyl group of to 10 carbon atoms such as an ethyl group, an isobutyl group, a hexyl group and an octyl group, even more particularly, an isobutyl group.

More particularly, the modified methylaluminoxane may be obtained by substituting about 50 mol % to 90 mol % of the methyl group of the methylaluminoxane with the hydrocarbonyl group. If the amount of the hydrocarbonyl group substituted in the modified methylaluminoxane is in the above-mentioned range, alkylation may be accelerated and catalyst activity may be increased.

Such modified methylaluminoxane may be prepared by a common method, particularly, prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

Meanwhile, an organomagnesium compound as the alkylating agent includes at least one magnesium-carbon bond, and may be a magnesium compound dissoluble in a non-polar solvent, specifically, a non-polar hydrocarbon-based solvent. Particularly, the organomagnesium compound may be a compound represented by the following Formula 8a:

$$Mg(R)_2 \qquad \text{[Formula 9a]}$$

in Formula 9a, R is each independently a monovalent organic group and is the same as the above-defined R.

More particularly, the organomagnesium compound of Formula 9a may be an alkylmagnesium compound such as diethylmagnesium, di-n-propylmagnesium, diisopropylmagnesium, dibutylmagnesium, dihexylmagnesium, diphenylmagnesium, and dibenzylmagnesium.

In addition, the organomagnesium compound may be a compound represented by the following Formula 9b:

$$RMgX \qquad \text{[Formula 9b]}$$

in Formula 9b, R is a monovalent organic group and is the same as the above defined R, X is selected from the group consisting of a hydrogen atom, a halogen group, a carboxyl group, an alkoxy group and an aryloxy group.

More particularly, the organomagnesium compound of Formula 9b may be a hydrocarbyl magnesium hydride such as methyl magnesium hydride, ethyl magnesium hydride, butyl magnesium hydride, hexyl magnesium hydride, phenyl magnesium hydride, benzyl magnesium hydride; a hydrocarbyl magnesium halide such as methyl magnesium chloride, ethyl magnesium chloride, butyl magnesium chloride, hexyl magnesium chloride, phenyl magnesium chloride, benzyl magnesium chloride, methyl magnesium bromide, ethyl magnesium bromide, butyl magnesium bromide, hexyl magnesium bromide, phenyl magnesium bromide, benzyl magnesium bromide; a hydrocarbyl magnesium carboxylate such as methyl magnesium hexanoate, ethyl magnesium hexanoate, butyl magnesium hexanoate, hexyl magnesium hexanoate, phenyl magnesium hexanoate, and benzyl magnesium hexanoate; a hydrocarbyl magnesium alkoxide such as methyl magnesium ethoxide, ethyl magnesium ethoxide, butyl magnesium ethoxide, hexyl magnesium ethoxide, phenyl magnesium ethoxide, benzyl magnesium ethoxide; or a hydrocarbyl magnesium aryloxide such as methyl magnesium phenoxide, ethyl magnesium phenoxide, butyl magnesium phenoxide, hexyl magnesium phenoxide, phenyl magnesium phenoxide, and benzyl magnesium phenoxide.

In addition, as the alkylating agent, an alkyl lithium of R'—Li as an organolithium compound (in this case, R' is a linear or branched alkyl group of 1 to 20 carbon atoms, more particularly, a linear alkyl group of 1 to 8 carbon atoms) may be used. More particularly, methyllithium, ethyllithium, isopropyllithium, n-butyllithium, sec-butyllithium, t-butyllithium, isobutyllithium, pentyllithium, isopentyllithium, etc. may be used, and any one or a mixture of at least two thereof may be used.

Among the above-described compounds, an alkylating agent used in the present invention may be specifically, diisobutylaluminum hydride (DIBAH) which may play the role of a molecular weight controlling agent during polymerization.

In addition, the alkylating agent may be the modified methylaluminoxane considering that catalyst activity and reactivity may be improved by using a solvent system used for preparing a catalyst composition as a single phase solvent of an aliphatic hydrocarbon system.

(c) Halogen Compound

In the catalyst composition for polymerizing the conjugated diene according to an embodiment of the present invention, the kind of the halogen compound is not specifically limited, but any halogenating agents commonly used in the preparation of a diene-based polymer may be used without specific limitation.

Particularly, the halogen compound may be a diatomic halogen (simple substance), an interhalogen compound, hydrogen halide, organic halide, nonmetal halide, metal halide, or organometallic halide, etc., and any one or a mixture of two or more thereof may be used. Among them, in consideration of the improvement of catalyst activity and consequent improving effect of reactivity, the halogen compound may be any one selected from the group consisting of an organic halide, a metal halide and an organometallic halide, or a mixture of at least two thereof.

More particularly, the diatomic halogen may include fluorine, chlorine, bromine, or iodine.

In addition, the interhalogen compound may particularly include iodine monochloride, iodine monobromide, iodine trichloride, iodine pentafluoride, iodine monofluoride, iodine trifluoride, etc.

In addition, the hydrogen halide may particularly include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide or selenium tetraiodide.

In addition, the metal halide may particularly include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

In addition, the organometallic halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition for preparing the conjugated diene polymer according to an embodiment of the present invention may include a non-coordinating anion-containing compound or a non-coordinating anion precursor compound instead of the halogen compound or together with the halogen compound.

Particularly, in the compound containing a non-coordinating anion, the non-coordinating anion may be an anion not forming a coordination bond with the active center of a catalyst system due to steric hindrance and having a sterically large volume, and may be a tetraarylborate anion or a tetraarylborate fluoride anion. In addition, the compound containing a non-coordinating anion may include a counter cation such as a carbonium cation such as a triaryl carbonium cation; an ammonium cation such as a N,N-dialkyl anilinium cation, and a phosphonium cation together with the non-coordinating anion. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, a triaryl boron compound ($BR_3$, where R is a strongly electron withdrawing aryl group such as a pentafluorophenyl group and a 3,5-bis(trifluoromethyl)phenyl group) may be used as a compound which is capable of forming a non-coordinating anion under reaction conditions.

The solvent according to an embodiment of the present invention may be a non-polar solvent having no reactivity with the components constituting the catalyst. Particularly, linear, branched or cyclic aliphatic hydrocarbon of 5 to 20 carbon atoms such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane and methylcyclohexane; a mixture solvent of aliphatic hydrocarbon of 5 to 20 carbon atoms such as petroleum ether, petroleum spirits, and kerosene; or an aromatic hydrocarbon-based solvent such as benzene, toluene, ethylbenzene, and xylene, and any one or a mixture of two or more thereof may be used. More particularly, the non-polar solvent may be linear, branched or cyclic aliphatic hydrocarbon of 5 to 20 carbon atoms or a mixture solvent of aliphatic hydrocarbon, more particularly, n-hexane, cyclohexane, or a mixture thereof.

In addition, the reaction solvent may be suitably selected according to the kind of the materials constituting the catalyst composition, specifically, the alkylating agent.

Particularly, in case where an alkylaluminoxane such as methylaluminoxane (MAO) and ethylaluminoxane is used as the alkylating agent, it is not easily dissolved in an aliphatic hydrocarbon-based solvent, and an aromatic hydrocarbon-based solvent may be suitably used.

In addition, in case where modified methylaluminoxane is used as the alkylating agent, an aliphatic hydrocarbon-based solvent may be suitably used. In this case, a single solvent system may be achieved with the aliphatic hydrocarbon-based solvent such as hexane which is mainly used as a polymerization solvent, and the polymerization reaction may be performed more favorably. In addition, the aliphatic hydrocarbon-based solvent may promote catalyst activity, and reactivity may be further improved due to such catalyst activity.

The above-described constituent components in the catalyst composition may form a catalyst active species via the interaction among them. Accordingly, the catalyst composition according to an embodiment of the present invention may include optimally combined amounts of the constituent components during polymerizing for forming a conjugated diene-based polymer so as to show even better catalyst activity and excellent polymerization reactivity.

Particularly, the catalyst composition may include 1 mol to 100 mol, particularly, 3 to 20 mol of the alkylating agent with respect to 1 mol of the rare earth metal compound. In addition, the catalyst composition may include 1 mol to 20 mol, more particularly, 1 mol to 5 mol, more particularly, 1 to 3 mol of the halogen compound with respect to 1 mol of the rare earth metal compound. By including the alkylating agent and the halogen compound in the above-described ranges, the control of catalyst reaction may be easy, and side reactions may be efficiently suppressed.

In addition, the catalyst composition may further include 20 mol to 20,000 mol, more particularly, 100 mol to 1,000 mol of the solvent with respect to 1 mol of the rare earth metal compound.

In the method for preparing a catalyst for polymerizing a conjugated diene according to an embodiment of the present invention, step S2 is a step for preforming by adding a conjugated diene-based monomer to the catalyst composition. If such preforming is performed, catalyst activity may be improved and the conjugated diene-based polymer thus prepared may be further stabilized. Particularly, any conjugated diene-based monomers commonly used for preparing a conjugated diene-based polymer may be used without specific limitation. Particularly, the conjugated diene-based monomer may include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, or 2,4-hexadiene, and any one among them or a mixture of two or more thereof may be used.

In addition, the conjugated diene-based monomer used for preparing the catalyst may be used in a partial amount within the range of the total amount used of the monomer for polymerization, particularly, 1 to 100 mol, more particularly, 10 to 50 mol, more particularly, 20 to 40 mol with respect to 1 mol of the rare earth metal compound.

The active polymer prepared in the step 1) according to an embodiment of the present invention may particularly be a rare earth metal catalyzed conjugated diene-based polymer, more particularly, a neodymium catalyzed conjugated diene-based polymer. The neodymium catalyzed conjugated diene-based polymer may represent a conjugated diene-based polymer including an organometal moiety derived from a catalyst composition including a neodymium compound, i.e., activated from a catalyst. More particularly, the conjugated diene-based polymer may be a neodymium catalyzed butadiene-based polymer including a repeating unit derived from 1,3-butadiene.

In the present invention, the activated organometal moiety of a conjugated diene-based polymer may be an activated organometal moiety at the terminal of the conjugated diene-based polymer (activated organometal moiety at the terminal of a molecular chain), an activated organometal moiety in a main chain or an activated organometal moiety in a side chain. If the activated organometal moiety of the conjugated diene-based polymer is obtained by anionic polymerization or coordination anionic polymerization, the activated organometal moiety may be an activated organometal moiety at the terminal.

The step 2) according to an embodiment of the present invention is a step of reacting the active polymer with a modifier represented by Formula 2 and is a step for forming a modified conjugated diene-based polymer.

The modification reaction may be performed by a common modification method except for using the conjugated diene-based polymer according to the present invention. Particularly, the step 2) is performed by injecting the modifier represented by Formula 2 to the mixture produced in the polymerization step and then, mixing for a certain time. The modification step may be performed using a batch-type reactor or using an apparatus such as a multi-step continuous reactor and an inline mixer. The modification step may preferably be performed under the same temperature and pressure conditions as the polymerization step, particularly, at a temperature of 20° C. to 200° C.

In addition, the modifier according to an embodiment of the present invention may be reacted by injecting 0.1 to 20 parts by weight, particularly, 0.1 to 10 parts by weight, more particularly, 0.1 to 3 parts by weight based on 100 parts by weight of the conjugated diene-based monomer.

After the modification step, additives such as a reaction quenching agent for finishing polymerization reaction, such as polyoxyethylene glycol phosphate; and an antioxidant such as 2,6-di-t-butylparacresol may be further used. In addition, additives generally serving easy solution polymerization, particularly, additives such as a chelating agent, a dispersant, a pH controlling agent, a deoxidizer, and an oxygen scavenger may be selectively used. After that, desolvation treatment such as steam stripping for lowering the partial pressure of a solvent via the supply of vapor, or a vacuum drying process may be selectively performed. In addition, a precipitation and filtering, drying, separating process, etc., may be additionally performed to obtain a polymer.

Further, the present invention provides a rubber composition including the conjugated diene-based polymer, and a molded article manufactured from the rubber composition.

The rubber composition according to an embodiment of the present invention may include the conjugated diene-based polymer in an amount of 0.1 wt % to 100 wt %, particularly, 10 wt % to 100 wt %, more particularly, 20 wt % to 90 wt %. If the amount of the conjugated diene-based polymer is less than 0.1 wt %, the improving effects of the abrasion resistance and crack resistance of a molded article manufactured using the rubber composition, for example, a tire, may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based copolymer.

The rubber component may be a natural rubber or a synthetic rubber, for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 150 parts by weight of a filler with respect to 100 parts by weight of the conjugated diene-based polymer, and the filler may be a silica-based filler, carbon black or a combination thereof. Particularly, the filler may be carbon black.

The carbon black-based filler is not specifically limited but may have a nitrogen adsorption specific surface area of, for example, 20 $m^2/g$ to 250 $m^2/g$ (measured based on N2SA, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2/g$, the processability of the rubber composition may be deteriorated, and if the nitrogen adsorption specific surface area of the carbon black is less than 20 $m^2/g$, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silicate), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, N2SA) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area of the silica is less than 120 $m^2/g$, the reinforcing performance due to silica may be deteriorated, and if the nitrogen absorption specific surface area of the silica is greater than 180 $m^2/g$, the processability of the rubber composition may be deteriorated. In addition, if the CTAB absorption specific surface area of the silica is less than 100 $m^2/g$, the reinforcing performance by the silica filler may be deteriorated, and if the CTAB absorption specific surface area of the silica is greater than 200 $m^2/g$, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl) trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropyl-benzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives commonly used in rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful for the manufacture of each member of a tire such as a tire tread, an under tread, a side wall, a carcass coating rubber, a belt coating rubber, a bead filler, a chafer, and a bead coating rubber, or for the manufacture of rubber products in various industries such as a vibration-proof rubber, a belt conveyor, and a hose.

The molded article manufactured using the rubber composition may include tires or tire treads.

Hereinafter, the present invention will be explained in more detail referring to embodiments. However, the embodiments below are only for illustrating the present invention, and the scope of the present invention is not limited thereto.

Example 1

Under nitrogen conditions, to a 10 L reactor, 2.7 kg of hexane and 300 g of 1,3-butadiene were injected, and the temperature was elevated to 70° C. A catalyst composition prepared by reacting a 0.38 mmol hexane solution of neodymium versatate (NdV), 3.7 mmol of diisobutylaluminum hydride (DIBAH), 0.96 mmol of diethylaluminum chloride and 13.2 mmol of 1,3-butadiene was added thereto, and polymerization was performed for 60 minutes. The conversion ratio of 1,3-butadiene to polybutadiene was about 100%. After finishing the polymerization reaction of 1,3-butadiene, a hexane solution including 1.5 g (7.6 mmol) of 1,4-butanediol diacrylate was added to a polymerization solution as a modifier, and the reaction was performed at 70° C. for 30 minutes. A hexane solution including 0.5 g of polyoxyethylene glycol phosphate as a polymerization quenching agent and a hexane solution including 0.5 g of 2,6-di-t-butyl-p-cresol as an antioxidant were added. The resultant polymer thus obtained was put in hot water heated with steam and stirred to remove solvents, and then hot roll dried to remove residual solvents and water to prepare a modifier conjugated diene polymer.

Example 2

A modified conjugated diene polymer was prepared by performing the same method described in Example 1 except for using a hexane solution including 2.4 g of 1,4-butanediol diacrylate as a modifier in Example 1.

Example 3

A modified conjugated diene polymer was prepared by performing the same method described in Example 1 except for using a hexane solution including 4.74 g (13.5 mmol) of pentaerythritol tetraacrylate as a modifier in Example 1.

Example 4

A modified conjugated diene polymer was prepared by performing the same method described in Example 1 except for using a hexane solution including 4.0 g (13.5 mmol) of trimethylolpropane triacrylate as a modifier in Example 1.

Comparative Example 1

An unmodified conjugated diene polymer was prepared by performing the same method described in Example 1 except for stirring at 70° C. for 30 minutes without using a modifier in Example 1.

Comparative Example 2

A modified conjugated diene polymer was prepared by performing the same method described in Example 1 except for using a hexane solution including 1.7 g (13.5 mmol) of n-butyl acrylate as a modifier in Example 1.

Comparative Example 3

A modified conjugated diene polymer was prepared by performing the same method described in Example 1 except for using a hexane solution including 3.4 g (27 mmol) of n-butyl acrylate as a modifier in Example 1.

Comparative Example 4

A modified conjugated diene polymer was prepared by performing the same method described in Example 1 except for using a hexane solution including 2.9 g (7.6 mmol) of dibutyltin diacrylate as a modifier in Example 1.

In this case, the dibutyltin diacrylate was prepared by adding a mixture of dibutyltin oxide (7.5 g, 30 mmol) and acrylic acid (4.3 g, 60 mmol) to a mixture solvent of 300 ml of toluene and 200 ml of acetonitrile, stirring at 80° C. for 5 hours, concentrating the mixture solution to ¼, decreasing the temperature to 0° C., and standing for 48 hours for recrystallization (8.0 g, 21.3 mmol, yield: 71%).

Experimental Example 1

With respect to each polymer prepared in the Examples and Comparative Examples, a number average molecular weight (Mn), a weight average molecular weight (Mw), molecular weight distribution (PDI), Mooney viscosity (MV), and a beta value (β-value) were measured by the methods below.

1) Weight Average Molecular Weight (Mw), Number Average Molecular Weight (Mn) and Molecular Weight Distribution (PDI)

Each polymer was dissolved in tetrahydrofuran (THF) for 30 minutes under 40° C. conditions, and the resultant solution was loaded on gel permeation chromatography (GPC) and flown to measure each molecular weight, and the molecular weight distribution was computed from the ratio of the weight average molecular weight and the number average molecular weight. In this case, two columns of PLgel Olexis and one column of PLgel mixed-C (trade name of Polymer Laboratories Co.) were used in combination. Also, newly replaced columns were all mixed bed type columns, and polystyrene was used as a GPC standard material.

2) Mooney Viscosity (MV, ML1+4, @100° C.) (MU) Value

The Mooney viscosity (ML1+4, @100° C.) (MU) was measured by means of MV2000E of Monsanto Co. using a large rotor at 100° C. at a rotor speed of 2±0.02 rpm conditions for each polymer. In this case, a specimen used was stood at room temperature (23±3° C.) for 30 minutes or more, and 27±3 g of the specimen was collected and put in a die cavity, and then, a platen was operated, and the Mooney viscosity was measured while applying torque.

Meanwhile, a specimen for measuring the Mooney viscosity of a polymer before modification was obtained by discharging a portion of a polymer at a step before injecting the polymer in each of the Examples and Comparative Examples, adding thereof to hot water heated with steam, stirring to remove solvents and hot roll drying to remove remaining solvents and water, and the Mooney viscosity was measured using the specimen thus obtained by the above-described method.

3) Beta Value (β-Value)

The beta value was obtained using D-RPA 3000 (rubber process analyzer) of Montech Co. and measuring tan δ in a frequency sweep range of 0-100 Hz, at static strain of 3%, at dynamic strain of 0.25% and at a measurement temperature of 100° C., and then representing as a slope of d(log(tan δ)/d(log(freq))) as the beta value (β-value).

TABLE 1

| | | Example | | | | Comparative Example | | | |
|---|---|---|---|---|---|---|---|---|---|
| Division | | 1 | 2 | 3 | 4 | 1 | 2 | 3 | 4 |
| | Modifier | BDDA | BDDA | PETTA | TMPTA | — | BA | BA | DTDA |
| | Modifier injection amount (phm) | 0.5 | 0.8 | 1.58 | 1.33 | — | 0.6 | 1.2 | 0.97 |
| GPC results | Mn ($\times 10^5$ g/mol) | 3.11 | 3.38 | 3.11 | 3.32 | 2.88 | 2.84 | 2.59 | 3.46 |
| | Mw ($\times 10^5$ g/mol) | 7.92 | 8.50 | 8.22 | 8.84 | 6.55 | 6.72 | 6.38 | 7.84 |
| | PDI (Mw/Mn) | 2.55 | 2.51 | 2.64 | 2.67 | 2.28 | 2.36 | 2.46 | 2.27 |
| Viscosity properties | Mooney viscosity before modification (MV) | 40.7 | 50.5 | 37.9 | 41.8 | 40.2 | 56.9 | 50.9 | 52.9 |
| | Mooney viscosity after modification (MV) | 70.4 | 85.4 | 81.8 | 96.8 | — | 63.0 | 60.6 | 63.3 |
| | ΔMV | 29.7 | 34.9 | 43.9 | 55.0 | — | 6.1 | 9.7 | 10.4 |
| | MV increasing ratio (%) | 73 | 69 | 116 | 132 | — | 10.7 | 19 | 19 |
| β-value | Before modification | 0.2428 | 0.2495 | 0.2458 | 0.2385 | 0.2377 | 0.2520 | 0.2553 | 0.2575 |
| | After modification | 0.1961 | 0.2092 | 0.1724 | 0.1694 | — | 0.2408 | 0.2416 | 0.2164 |

*BDDA: 1,4-butanediol diacrylate
*PETTA: pentaerythritol tetraacrylate
*TMPTA: trimethylolpropane triacrylate
*BA: butyl acrylate
*DTDA: dibutyltin diacrylate
*phm: parts by weight based on 100 parts by weight of a conjugated diene-based monomer As shown in Table 1, Examples 1 to 4, which include a modifier derived unit with a specific structure at one terminal showed a markedly increased Mooney viscosity increasing ratio when compared with Comparative Examples 1 to 4, and showed a markedly decreased beta value of a conjugated diene-based polymer after modification.

Experimental Example 2

Rubber compositions and rubber specimens were prepared using the modified conjugated diene polymers prepared in the Examples and Comparative Examples and the unmodified conjugated diene polymer and modified conjugated diene polymers prepared in the Comparative Examples, and processability properties were measured by the method below. The results are shown in Table 2 below.

Particularly, each rubber composition was prepared by compounding 100 parts by weight of each polymer with 70 parts by weight of carbon black, 22.5 parts by weight of a process oil, 2 parts by weight of an antiaging agent (TMDQ), 3 parts by weight of zinc white (ZnO), and 2 parts by weight of stearic acid. Then, to each rubber composition, 2 parts by weight of sulfur, 2 parts by weight of a vulcanization accelerator (CZ) and 0.5 parts by weight of a vulcanization accelerator (DPG) were added and gently mixed at 50° C. for 1.5 minutes in 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

1) Cold Flow (Mg/Min)

The cold flow of each rubber specimen was measured using a cold flow test device in an oven of 50° C. In this case, the cold flow test device is composed of a copper holder welded on a supporter and a holder cap which is capable of covering the upper portion of the copper holder. Particularly, the copper holder has a cylindrical shape with a diameter of 1.5 cm and a height of about 10 cm. On the top of the copper holder, a rubber specimen of about 1 g is installed, and a holder cap having a weight of 318 g is combined from the top of the holder in a gravity direction. Here, the holder cap is formed from a copper material, has a tubular form blocked in the top, a height of about 10 cm, and a hole with a diameter of about 5 mm at the center of the blocked top surface. In addition, since the diameter of the holder cap is about 1.6 cm and is greater than the diameter of the copper holder, if the holder cap covers the upper portion of the holder, the holder goes into the holder cap tube, and the same load as the weight of the holder cap may be applied to the rubber specimen installed on the top surface of the copper holder. After that, the cold flow test device equipped with the rubber specimen is put in an oven and stood in the oven for about 30 minutes until the temperature becomes 50° C. In this case, the rubber specimen flown out through the hole formed in the holder cap of the test device is removed with a sharp knife at one go. Then, rubber flown out from the holder is cut every 10 minutes, and the weight of the cut rubber is measured. This step is repeated three times, the average value of the rubber weights for three times is computed, and the rubber weight flown per unit hour (minutes) is computed using the average value. In this case, the greater the cold flow value is, the worse the storage stability is.

2) Processability

The processability was obtained by measuring Mooney viscosity (FMB, final master batch) using the vulcanized compounding product and confirming through a Mooney viscosity difference (ΔMV). Here, the Mooney viscosity difference represents difference between the Mooney viscosity of each polymer shown in Table 1 after modification and the Mooney viscosity of the compounding materials (ΔMV, FMB-RP), and the smaller difference of the Mooney viscosity represents excellent processability.

Particularly, the Mooney viscosity (ML1+4, @100° C.) (MU) was measured using each vulcanized compounding product thus prepared. The Mooney viscosity (MV) was measured by means of MV2000E of Monsanto Co. using a large rotor at 100° C. at a rotor speed of 2±0.02 rpm conditions for each polymer. In this case, a specimen used was stood at room temperature (23±3° C.) for 30 minutes or more, and 27±3 g of the specimen was collected and put in a die cavity, and then, a platen was operated and the Mooney viscosity (FMB) was measured while applying torque.

TABLE 2

| Division | Example | | | | Comparative Example | | | |
|---|---|---|---|---|---|---|---|---|
| | 1 | 2 | 3 | 4 | 1 | 2 | 3 | 4 |
| Mooney viscosity (FMB) | 80.4 | 100.4 | 88.8 | 101.8 | 74.2 | 89.0 | 92.6 | 83.3 |
| Mooney viscosity difference (processability) | 10 | 15 | 7 | 5 | 34 | 26 | 32 | 20 |
| Cold flow (mg/min) | 0.5 | 0.6 | 0.3 | 0.2 | 1.4 | 0.9 | 0.9 | 0.7 |

As shown in Table 2, it could be confirmed that Examples 1 to 4 showed markedly excellent processability and significantly improved cold flow when compared with Comparative Examples 1 to 4.

The invention claimed is:

1. A modified conjugated diene-based polymer represented by the following Formula 1, wherein a terminal of a polymer chain is modified:

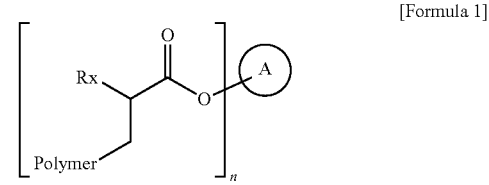

[Formula 1]

in Formula 1,

A is a hydrocarbon unit of 2 to 12 carbon atoms, or a hydrocarbon unit of 2 to 12 carbon atoms including one or more heteroatoms of N or O, $R_x$ is hydrogen or a methyl group, and n is an integer of 2 to 6.

2. The modified conjugated diene-based polymer of claim 1, wherein the hydrocarbon unit of 2 to 12 carbon atoms is a unit represented by the following Formula 3:

$$*-R_{a1}-*$$ [Formula 3]

in Formula 3, $R_{a1}$ is a linear or branched alkylene group of 2 to 12 carbon atoms, or an arylene group of 6 to carbon atoms, and

* is a position where a derived unit of (meth)acrylate of Formula 1 is combined.

3. The modified conjugated diene-based polymer of claim 1, wherein the hydrocarbon unit of 2 to 12 carbon atoms including the one or more heteroatoms of N or O is represented by one of the following formulae 4-1 to 4-4:

$$(R_{b1})_3C-R_{b2}-O-R_{b3}-C(R_{b4})_{m1}(R_{b5})_{3-m1}$$ [Formula 4-1]

in Formula 4-1, $R_{b1}$ and $R_{b4}$ are each independently an alkyl group of 1 to 5 carbon atoms, wherein a derived unit of (meth)acrylate of Formula 1 is combined at a terminal, $R_{b2}$ and $R_{b3}$ are each independently an alkylene group of 1 to 5 carbon atoms, $R_{b5}$ is a hydroxyl group, and $m1$ is an integer of 1 to 3;

$$C(R_{c1}-O-R_{c2})_{m2}(R_{c3})_{4-m2}$$ [Formula 4-2]

in Formula 4-2, $R_{c1}$ is an alkylene group of 1 to 6 carbon atoms, $R_{c2}$ is an alkyl group of 1 to 6 carbon atoms, wherein a derived unit of (meth)acrylate of Formula 1 is combined at a terminal, $R_{c3}$ is hydrogen or an alkyl group of 1 to 6 carbon atoms, and $m2$ is an integer of 1 to 4;

$$C(R_{d1})_{m3}(R_{d2})_{4-m3}$$ [Formula 4-3]

in Formula 4-3, $R_{d1}$ is an alkyl group of 1 to 6 carbon atoms, wherein a derived unit of (meth)acrylate of Formula 1 is combined at a terminal, $R_{d2}$ is a hydroxyl group or an alkyl group of 1 to 6 carbon atoms, and $m3$ is an integer of 1 to 4;

[Formula 4-4]

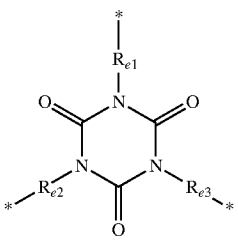

in Formula 4-4, $R_{e1}$ to $R_{e3}$ are each independently an alkylene group of 1 to 5 carbon atoms, and

* is a position where a derived unit of (meth)acrylate of Formula 1 is combined.

4. The modified conjugated diene-based polymer of claim 1, wherein the modified conjugated diene-based polymer comprises a modifier derived functional group which is derived from one or more modifiers selected from the group consisting of dipentaerythritol hexaacrylate, dipentaerythritol hydroxy pentaacrylate, pentaerythritol tetraacrylate, pentaerythritol triacrylate, trimethylolpropane triacrylate, propoxylated glycerol triacrylate, trimethylolpropane ethoxylated triacrylate, 1,6-hexanediol diacrylate, 1,4-butanediol diacrylate, 1,2-ethanediol diacrylate, neopentyl glycol diacrylate, 1,3-butanediol diacrylate, 1,4-phenylene diacrylate, tris(2-hydroxyethyl)isocyanurate triacrylate, tripropylene glycol diacrylate, polyethylene glycol diacrylate, dipentaerythritol hexamethacrylate, dipentaerythritol hydroxy pentamethacrylate, pentaerythritol tetramethacrylate, pentaerythritol trimethacrylate, trimethylolpropane trimethacrylate, propoxylated glycerol trimethacrylate, trimethylolpropane ethoxylated trimethacrylate, trimethylolpropane ethoxy trimethacrylate, 1,6-hexanediol metacrylate, 1,4-butanediol dimethacrylate, 1,2-ethanediol dimethacrylate, neopentyl glycol dimethacrylate, 1,3-butanediol dimethacrylate, 1,4-phenylene dimethacrylate, isocyanurate trimethacrylate, tripropylene glycol dimethacrylate, ethylene glycol dimethacrylate, and polyethylene glycol dimethacrylate.

5. The modified conjugated diene-based polymer according to claim 1, wherein the modified conjugated diene-based polymer has a beta value (β-value) of 0.21 or less.

6. The modified conjugated diene-based polymer of claim 1, wherein the modified conjugated diene-based polymer has:
a Mooney viscosity at 100° C. of a conjugated diene-based polymer before modification of 10 to 90, and
a Mooney viscosity at 100° C. of a conjugated diene-based polymer after modification of 50 to 130.

7. The modified conjugated diene-based polymer of claim 1, wherein the modified conjugated diene-based polymer has a Mooney viscosity increasing ratio according to the following Mathematical Formula 1 of 20% or more:

[Mathematical Formula 1]

Mooney viscosity increasing ratio (%) =

$$\frac{\text{(mooney viscosity at 100° C. of polymer after modification} - \text{mooney viscosity at 100° C. of polymer before modification)}}{\text{(mooney viscosity at 100° C. of polymer before modification)}} \times 100.$$

8. A method for preparing a modified conjugated diene-based polymer, comprising:
polymerizing a conjugated diene-based monomer in the presence of a catalyst composition comprising a rare earth metal compound to prepare an active polymer combined with an organometal; and
reacting the active polymer with a modifier represented by the following Formula 2:

[Formula 2]

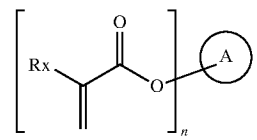

in Formula 2,

A is a hydrocarbon unit of 2 to 12 carbon atoms, or a hydrocarbon unit of 2 to 12 carbon atoms including one or more heteroatoms of N or O, $R_x$ is hydrogen or a methyl group, and n is an integer of 2 to 6.

9. The method for preparing a modified conjugated diene-based polymer of claim 8, wherein the hydrocarbon unit of 2 to 12 carbon atoms is a unit represented by the following Formula 3, and the hydrocarbon unit of 2 to 12 carbon atoms including the one or more heteroatoms is N or O is represented by one of the following formulae 4-1 to 4-4:

$$*—R_{a1}—*$$ [Formula 3]

in Formula 3, $R_{a1}$ is a linear or branched alkylene group of 2 to 12 carbon atoms, or an arylene group of 6 to carbon atoms, and

* is a position where a derived unit of (meth)acrylate of Formula 2 is combined;

$$(R_{b1})_3C—R_{b2}—O—R_{b3}—C(R_{b4})_{m1}(R_{b5})_{3-m1}$$ [Formula 4-1]

in Formula 4-1, $R_{b1}$ and $R_{b4}$ are each independently an alkyl group of 1 to 5 carbon atoms, wherein a derived unit of (meth)acrylate of Formula 2 is combined at a terminal, and $R_{b2}$ and $R_{b3}$ are each independently an alkylene group of 1 to 5 carbon atoms, $R_{b5}$ is a hydroxyl group, and $m1$ is an integer of 1 to 3;

$$C(R_{c1}—O—R_{c2})_{m2}(R_{c3})_{4-m2}$$ [Formula 4-2]

in Formula 4-2, $R_{c1}$ is an alkylene group of 1 to 6 carbon atoms, $R_{c2}$ is an alkyl group of 1 to 6 carbon atoms, wherein a derived unit of (meth)acrylate of Formula 2 is combined at a terminal, $R_{c3}$ is hydrogen or an alkyl group of 1 to 6 carbon atoms, and $m2$ is an integer of 1 to 4;

$$C(R_{d1})_{m3}(R_{d2})_{4-m3}$$ [Formula 4-3]

in Formula 4-3, $R_{d1}$ is an alkyl group of 1 to 6 carbon atoms, wherein a derived unit of (meth)acrylate of Formula 2 is combined at a terminal, $R_{d2}$ is a hydroxyl group or an alkyl group of 1 to 6 carbon atoms, and $m3$ is an integer of 1 to 4;

[Formula 4-4]

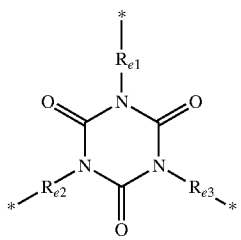

in Formula 4-4,
$R_{e1}$ to $R_{e3}$ are each independently an alkylene group of 1 to 5 carbon atoms, and
* is a position where a derived unit of (meth)acrylate of Formula 2 is combined.

10. The method for preparing a modified conjugated diene-based polymer of claim 8, wherein the modifier comprises one or more selected from the group consisting of dipentaerythritol hexaacrylate, dipentaerythritol hydroxy pentaacrylate, pentaerythritol tetraacrylate, pentaerythritol triacrylate, trimethylolpropane triacrylate, propoxylated glycerol triacrylate, trimethylolpropane ethoxylated triacrylate, 1,6-hexanediol diacrylate, 1,4-butanediol diacrylate, 1,2-ethanediol diacrylate, neopentyl glycol diacrylate, 1,3-butanediol diacrylate, 1,4-phenylene diacrylate, tris(2-hydroxyethyl)isocyanurate triacrylate, tripropylene glycol diacrylate, polyethylene glycol diacrylate, dipentaerythritol hexamethacrylate, dipentaerythritol hydroxy pentamethacrylate, pentaerythritol tetramethacrylate, pentaerythritol trimethacrylate, trimethylolpropane trimethacrylate, propoxylated glycerol trimethacrylate, trimethylolpropane ethoxylated trimethacrylate, trimethylolpropane ethoxy trimethacrylate, 1,6-hexanediol metacrylate, 1,4-butanediol dimethacrylate, 1,2-ethanediol dimethacrylate, neopentyl glycol dimethacrylate, 1,3-butanediol dimethacrylate, 1,4-phenylene dimethacrylate, isocyanurate trimethacrylate, tripropylene glycol dimethacrylate, ethylene glycol dimethacrylate, and polyethylene glycol dimethacrylate.

11. The method for preparing a modified conjugated diene-based polymer of claim 8, wherein the rare earth metal compound comprises a neodymium compound of the following Formula 5:

[Formula 5]

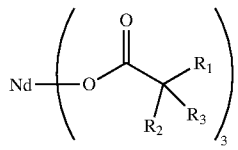

in Formula 5, $R_1$ to $R_3$ are each independently hydrogen or a linear or branched alkyl group of 1 to 12 carbon atoms.

12. The method for preparing a modified conjugated diene-based polymer of claim 11, wherein the rare earth metal compound comprises a neodymium compound of Formula 5 in which $R_1$ is a linear or branched alkyl group of 6 to 12 carbon atoms, and $R_2$ and $R_3$ are each independently a hydrogen atom or a linear or branched alkyl group of 2 to 8 carbon atoms, where $R_2$ and $R_3$ are not hydrogen at the same time.

13. The method for preparing a modified conjugated diene-based polymer of claim 8, wherein the catalyst composition comprises a rare earth metal compound, an alkylating agent and a halogen compound.

14. The method for preparing a modified conjugated diene-based polymer of claim 13, wherein the catalyst composition further comprises a conjugated diene-based monomer.

15. A rubber composition comprising the modified conjugated diene-based polymer described in claim 1.

16. The modified conjugated diene-based polymer according to claim 1, wherein the modified conjugated diene-based polymer has a beta value (β-value) of 0.1 to 0.21.

17. The modified conjugated diene-based polymer of claim 1, wherein the modified conjugated diene-based polymer has a Mooney viscosity increasing ratio according to the following Mathematical Formula 1 of 50 to 150%:

[Mathematical Formula 1]

$$\text{Mooney viscosity increasing ratio (\%)} = \frac{(\text{mooney viscosity at } 100°C. \text{ of polymer after modification} - \text{mooney viscosity at } 100°C. \text{ of polymer before modification})}{(\text{mooney viscosity at } 100°C. \text{ of polymer before modification})} \times 100.$$

* * * * *